US012701099B2

(12) United States Patent
    Walther

(10) Patent No.: US 12,701,099 B2
(45) Date of Patent: Aug. 4, 2026

(54) METHOD FOR IDENTIFYING NETWORK SERVICES IN A NETWORK HAVING INTERNET-OF-THINGS NETWORK SUBSCRIBERS

(71) Applicant: PERINET GMBH, Berlin (DE)

(72) Inventor: Karsten Walther, Königs Wusterhausen (DE)

(73) Assignee: PERINET GMBH, Berlin (DE)

( * ) Notice: Subject to any disclaimer, the term of this patent is extended or adjusted under 35 U.S.C. 154(b) by 0 days.

(21) Appl. No.: 17/766,016

(22) PCT Filed: Oct. 1, 2020

(86) PCT No.: PCT/EP2020/077500
§ 371 (c)(1),
(2) Date: Apr. 1, 2022

(87) PCT Pub. No.: WO2021/064096
PCT Pub. Date: Apr. 8, 2021

(65) Prior Publication Data
US 2022/0368668 A1     Nov. 17, 2022

(30) Foreign Application Priority Data
Oct. 1, 2019     (DE) ..................... 10 2019 126 486.3

(51) Int. Cl.
*H04L 61/4511*     (2022.01)
*H04L 61/4541*     (2022.01)
*H04L 67/51*       (2022.01)

(52) U.S. Cl.
CPC ...... *H04L 61/4511* (2022.05); *H04L 61/4541* (2022.05); *H04L 67/51* (2022.05)

(58) Field of Classification Search
CPC . H04L 61/4511; H04L 67/51; H04L 61/4541; H04L 69/167; H04L 61/45; H04W 8/005
See application file for complete search history.

(56) References Cited

U.S. PATENT DOCUMENTS 9,479,572 B1 *  10/2016  Subramanian ...... H04L 61/4511
9,553,843 B1 *   1/2017  Smith ...................... G06F 8/65
(Continued)

FOREIGN PATENT DOCUMENTS

CN     103973830 A     8/2014
CN     105075225 A     11/2015
(Continued)

OTHER PUBLICATIONS

Manning, Discover: Supporting Multicast DNS Queries; Nov. 2012; Request for Comments: 6804; pp. 1-8 (Year: 2012).*
(Continued)

*Primary Examiner* — Tonia L Dollinger
*Assistant Examiner* — Linh T. Nguyen
(74) *Attorney, Agent, or Firm* — Seed Intellectual Property Law Group LLP

(57)                    ABSTRACT

A method is provided for identifying network services in a network having at least one Internet-of-Things network subscriber, in particular Internet-of-Things sensors/actuators, based on domain name system service discovery DNS-SD via a multicast domain name system mDNS. A domain name system service discovery DNS-SD compliant request for a network service type is transmitted by an Internet-of-Things network subscriber to a network having at least one host that provides network services. At least one domain name system service discovery DNS-SD compliant response to the request is received from one of the hosts. The response comprises a text field having a network service identifier. A connection request is transmitted by the Internet-of-Things network subscriber to the host to which the network service identifier is assigned and which provides the desired network service.

3 Claims, 2 Drawing Sheets

(56) References Cited

U.S. PATENT DOCUMENTS

| | | | | |
|---|---|---|---|---|
| 9,774,709 | B2 * | 9/2017 | Bhagwat | H04L 69/24 |
| 10,284,659 | B2 * | 5/2019 | Cheshire | H04L 61/4541 |
| 10,715,482 | B2 * | 7/2020 | Rahman | H04L 67/51 |
| 2009/0063686 | A1 * | 3/2009 | Schmidt | H04L 67/54 |
| | | | | 709/227 |
| 2009/0291631 | A1 * | 11/2009 | Xue | H04L 67/51 |
| | | | | 455/3.01 |
| 2014/0089478 | A1 * | 3/2014 | Seed | H04W 4/50 |
| | | | | 709/222 |
| 2014/0244860 | A1 * | 8/2014 | A.R. | H04L 61/4511 |
| | | | | 709/245 |
| 2014/0244996 | A1 * | 8/2014 | Parthasarathy | H04L 63/104 |
| | | | | 713/150 |
| 2014/0269703 | A1 * | 9/2014 | Sundaresan | H04L 61/4511 |
| | | | | 370/390 |
| 2014/0366105 | A1 * | 12/2014 | Bradley | H04W 76/14 |
| | | | | 726/5 |
| 2014/0376405 | A1 * | 12/2014 | Erickson | H04L 69/22 |
| | | | | 370/254 |
| 2015/0019759 | A1 * | 1/2015 | Tran | H04L 41/0886 |
| | | | | 709/245 |
| 2015/0020159 | A1 * | 1/2015 | Xu | H04W 12/08 |
| | | | | 726/3 |
| 2015/0142968 | A1 | 5/2015 | Bhagwat et al. | |
| 2015/0341446 | A1 | 11/2015 | Nguyen et al. | |
| 2016/0036762 | A1 * | 2/2016 | Droms | H04L 41/12 |
| | | | | 709/224 |
| 2016/0127305 | A1 | 5/2016 | Droms et al. | |
| 2016/0219014 | A1 * | 7/2016 | Forsman | H04L 61/5007 |
| 2017/0078408 | A1 * | 3/2017 | Lepp | H04L 67/561 |
| 2018/0159960 | A1 * | 6/2018 | Farrugia | H04L 67/52 |
| 2018/0191666 | A1 | 7/2018 | Rahman et al. | |
| 2019/0166481 | A1 * | 5/2019 | Nakagawa | H04W 76/14 |
| 2019/0182204 | A1 * | 6/2019 | Kachalia | G06F 16/90348 |
| 2019/0182300 | A1 | 6/2019 | Simotas et al. | |
| 2019/0230503 | A1 * | 7/2019 | Circosta | H04W 12/50 |

FOREIGN PATENT DOCUMENTS

| | | | | |
|---|---|---|---|---|
| CN | 105284178 | A | 1/2016 | |
| CN | 106133714 | A | 11/2016 | |
| CN | 107835149 | A | 3/2018 | |
| CN | 109246024 | A | 1/2019 | |
| EP | 3320671 | B1 * | 9/2020 | H04L 61/1511 |
| WO | WO 2014101935 | A1 | 7/2014 | |
| WO | WO 2014200691 | A1 | 12/2014 | |

OTHER PUBLICATIONS

Manning; Discover: Supporting Multicast DNS Queries; 6804; pp. 1-9. (Year: 2012).*

Cheshire et al., "DNS-Based Service Discovery," *Internet Engineering Task Force*(*IETF*), Request for Comments: 6763, Feb. 2013, 49 pages.

S. Thomson et al., "IPv6 Stateless Address Autoconfiguration", rfc4862.txt, Internet Engineering Task Force, IETF; Standard, Internet Society (ISOC) 4, Rue Desfalaises CH—1205 Geneva, Switzerland, Sep. 2007. (30 pages).

* cited by examiner

METHOD FOR IDENTIFYING NETWORK SERVICES IN A NETWORK HAVING INTERNET-OF-THINGS NETWORK SUBSCRIBERS

BACKGROUND

Technical Field

The present invention relates to a method for identifying network services in a network with Internet-of-Things network subscribers.

Description of the Related Art

In the field of Internet-of-Things (IoT), network subscribers (e.g., sensors and/or actuators) are typically connected to a network via cables or wirelessly to allow communication with services in the network. A communication between the network subscribers (e.g., sensors and/or actuators) and the services in the network can be based on an IP protocol, for example. For example, the search for a service on the network can be performed by a domain name system DNS-based service discovery according to the IETF RFC6763 standard. The IoT network subscribers (e.g., sensors/actuators) are typically configured so that they can communicate with a fixed network service. If the address of the network service is changed, all IoT sensors/actuators connected to it must be reconfigured, resulting in considerable effort upon each address change of the network service.

In the German patent application giving rise to a right of priority, the German Patent and Trademark Office has examined the following documents: US 2015/0341446 A1, US 2016/0127305 A1 and US 2015/0142968 A1.

BRIEF SUMMARY

Provided is a method for identifying services in a network having Internet-of-Things sensors/actuators, which enables an improved and more effective identification.

A method is thus provided for identifying network services in a network having at least one host which provides each network service with a network service identifier, having at least one Internet-of-Things sensor/actuator based on domain name system service discovery DNS-SD via a multicast domain name system mDNS. A domain name system service discovery DNS-SD compliant request for a network service or network service type is sent by a network subscriber (e.g., Internet-of-Things sensors/actuators) to a network having at least one host which provides network services. The host can itself represent an IoT device. At least one domain name system service discovery DNS-SD compliant response from one of the hosts to the request is received by the sensor/actuator. The response from the hosts contains a text field with a network service identifier of the network service that matches the requested network service type on the application layer. A connection request is sent by the Internet-of-Things sensor/actuator to the host that offers the desired network service and which has a network service identifier that matches the application of the sensor/actuator. This enables a standard-compliant, simple and efficient means of providing a decentralized search for network services. By specifying the network service identifier in the text field, a filtering option for the relevant services is made possible.

According to one aspect of the invention, the network service identifier represents an identifier, an identifier of the Internet-of-Things network subscriber and/or of the associated network service on the application layer. Optionally, the identifier can be freely or substantially freely selected by the user when setting up a system. The user thus determines the name of the network service identifier and/or of the associated IoT network subscriber on the application layer. This enables improved addressing of the respective network service identifiers and/or the respective IoT network subscribers.

According to one aspect of the invention, the domain name system service discovery DNS-SD compliant response comprises, in addition to the host address information consisting of host URL and a port number, an application-layer service identifier in the TXT field, which according to the standard is only optional. With the aid of these, the IoT sensor/actuator can dynamically identify the service associated with it independently and distinguish it from other similar services in the local network. In other words, instead of a modifiable, purely structural address (IP address or host name), the identification can be performed on a static identifier on the application layer without the need to use or maintain a mapping table.

This allows the IoT network subscribers, e.g., IoT sensors/actuators, to independently identify those hosts that offer the network service required by the IoT sensors/actuators and connect to them via the IP protocol, so that the IoT sensors can transmit their data via the network to the network service. This leads to significantly reduced configuration effort and the IoT sensors/actuators carry out the search, the identification and the connection to the network services independently. This is made possible by suitably enriching the response of the host with IoT application-specific information. In a response in a DNS SD over mDNS the text field TXT indicates the IoT application to which a network service belongs. With this information, a remote station can dynamically learn how to address the network service being sought, which is assigned to an IoT application, in order to enable communication.

According to one aspect of the invention, a distributed identification of central network services of a distributed IoT application can take place in the local network. The network service is identified by an entry in a text field TXT of an mDNS-SD compliant response. The entry in the text field can have an application-layer identifier.

According to another aspect of the invention, the multicast domain name system mDNS optionally represents a wide-area mDNS. The network services can thus also be identified in distributed local networks.

According to another aspect of the invention, the Internet-of-Things sensors/actuators and/or the hosts are optionally addressed based on IPv6 link local addresses. This leads to a further reduction in the effort involved in configuring the IoT sensors/actuators.

According to one aspect of the invention, the IoT sensors/actuators themselves can be service providers in an IoT application, e.g., an IoT temperature sensor can offer a thermometer service. Thus, IoT sensors/actuators simultaneously act as hosts. Furthermore, there are many other conceivable services on hosts in the network, e.g., a web-based status display (dashboard), which displays the data from the IoT sensors/actuators. The method is suitable for identifying any kind of local IoT services and thus allows all combinations of the identification, which is also optionally mutual, of IoT sensors/actuators and hosts.

According to one aspect of the invention, distributed IoT network subscribers can identify entries by means of the application identifier of the components in the text field TXT of the announced mDNS-SD. Further actions can then be performed, such as a software update or a firmware update.

BRIEF DESCRIPTION OF THE SEVERAL VIEWS OF THE DRAWINGS

Further embodiments of the invention are the subject matter of the dependent claims.

Advantages and exemplary embodiments of the invention are elucidated below with reference to the drawing.

DETAILED DESCRIPTION

The invention relates to an Internet-of-Things (IoT) infra-structure, in which a plurality of IoT network subscribers (e.g., IoT sensors, actuators, wireless transmitters/receivers, etc.) can communicate over a network (e.g., the internet or a local network) with other components, such as hosts that provide network services. The communication of the sensors, actuators and/or the wireless transmitters/receivers with a network as well as with hosts in the network is based on an IP protocol. As an option, IoT network subscribers (IoT sensors/actuators and/or wireless transmitters/receivers) can act as hosts. The search, for example, by the IoT network subscriber for an associated network service uses DNS-SD over mDNS (domain name system-service discovery via multicast domain name system, see standard: IETF RFC 6762). The IoT network subscriber requires a network service to be able to communicate and transmit data or measurements to the network service. The network service, in turn, is used to receive this data and optionally to control or transmit commands to the IoT network subscriber.

According to one aspect of the present invention, specific names or individual identifiers can be assigned to the respective IoT network subscribers or the associated net-work services. For example, the identifiers can represent TI211-temperature collector input. Optionally, the identifiers or the descriptors or names of the respective IoT network subscribers can be defined by the user.

Figure 1:
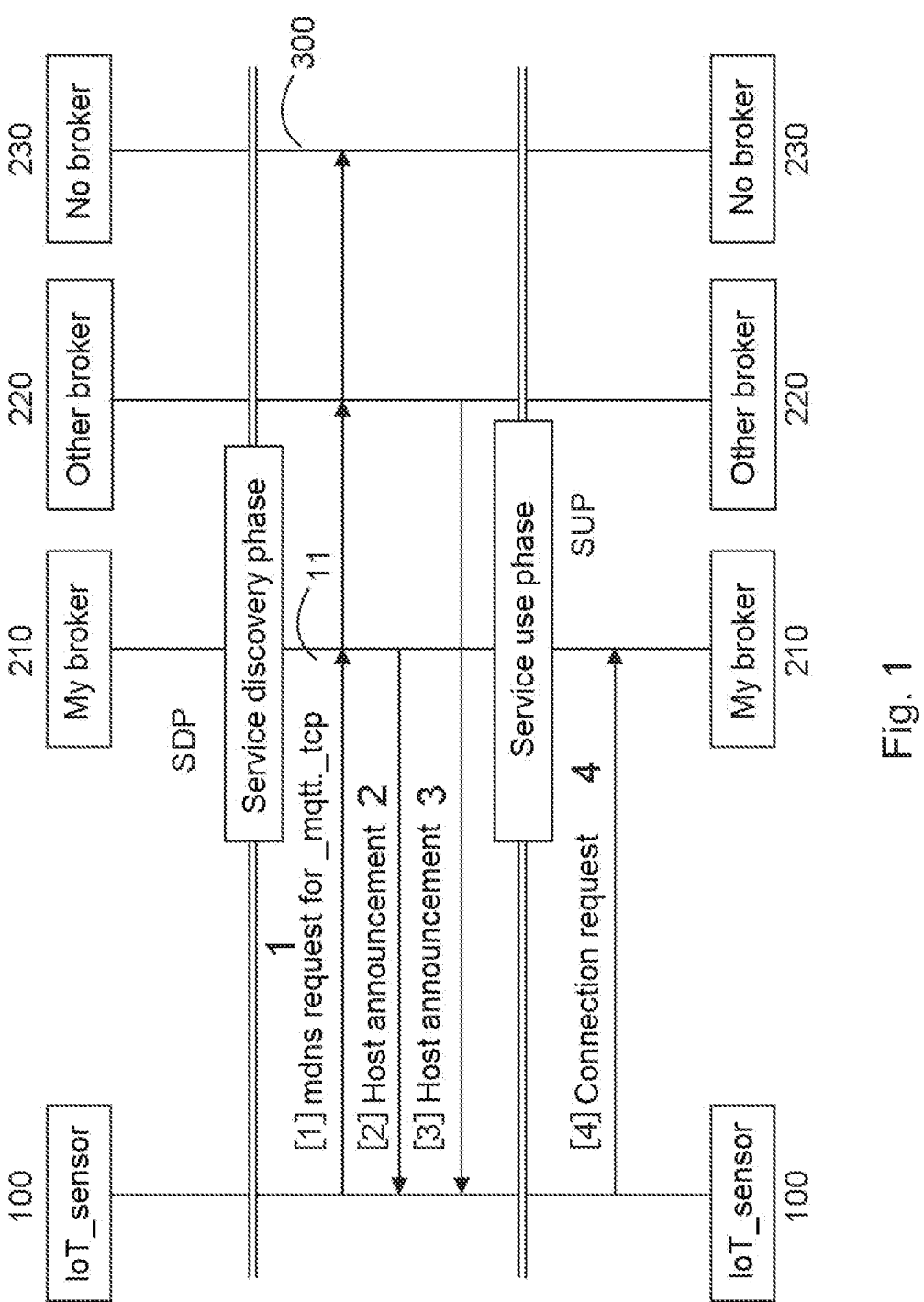
FIG. 1 shows a schematic view of a process sequence of a search for services in a network according to a first exemplary embodiment of the invention.

FIG. 1 shows a schematic representation of a process sequence of a search for services according to a first exemplary embodiment of the invention. According to the first exemplary embodiment, a service discovery, i.e., a search for a network service, is performed based on mDNS. An IoT network subscriber 100 (e.g., sensor/actuator) sends a request 1 (mdns request) for a network service of a specific type 11 into the connected network 300. A plurality of hosts 210, 220, 230 that provide network services are connected to the network 300. If any of the hosts 210, 220, 230 provides the network service of the requested type 11, the host 210, 220 responds with an mDNS-SD announcement 2, 3. The request 1 and the responses 2, 3 are made in a service discovery phase SDP. Each response 2, 3 (mDNS announce-ment) comprises the address information consisting of net-work name 13 (consisting of host name 13a and domain 13b) and port 14, as well as the service identifier on the application layer 12, where the latter is contained in a text field TXT of the response 2, 3. The application identifier 12 can be used to identify the associated network service that is sought. If the IoT network subscriber (e.g., sensor/actuator 100) has identified the correct network service using the application identifier 12, a connection request 4 is made in a Service Using Phase SUP from the IoT sensor/actuator 100 to the corresponding host 210 providing the required net-work service. The IoT Sensor 100 uses the address infor-mation from the mDNS-SD announcement consisting of network name 13 and port number 14.

This allows an IoT sensor/actuator 100 to achieve an independent and dynamic connection to a desired network service. Advantageously, configuration of IP addresses, for example, is no longer necessary.

According to one aspect of the present invention, a user can identify the IoT network subscribers 100 and/or the associated network services in their system with their own identifiers. These specific identifiers can appear in the text field TXT so that a user can directly recognize IoT network subscribers and/or the associated network services in their identifier structure (naming system of the IoT network subscribers and/or the associated network services). This is advantageous because it means the user does not need a mapping table (application identifier to the IP address; infrastructure address or structural address). In addition, a mapping table of a bus address is thus required in non-IP-based systems.

For example, an identifier for an IoT temperature sensor and/or the associated network service can be represented by TIxxx. For example, the identifier for a valve can be represented by Vxxx. Optionally, the user can implement the respective identifier for the IoT network subscribers/network service on the basis of a system diagram or a system structure, which is to be enabled by its being controlled by the IoT network subscribers.

According to one aspect of the invention, IPv6 link local addresses are used in the allocation of the IP addresses. This allows the hosts 210-230 and the network subscriber 100 to allocate or assign the IP addresses themselves. This is again advantageous, as it no longer requires central administration.

Figure 2:
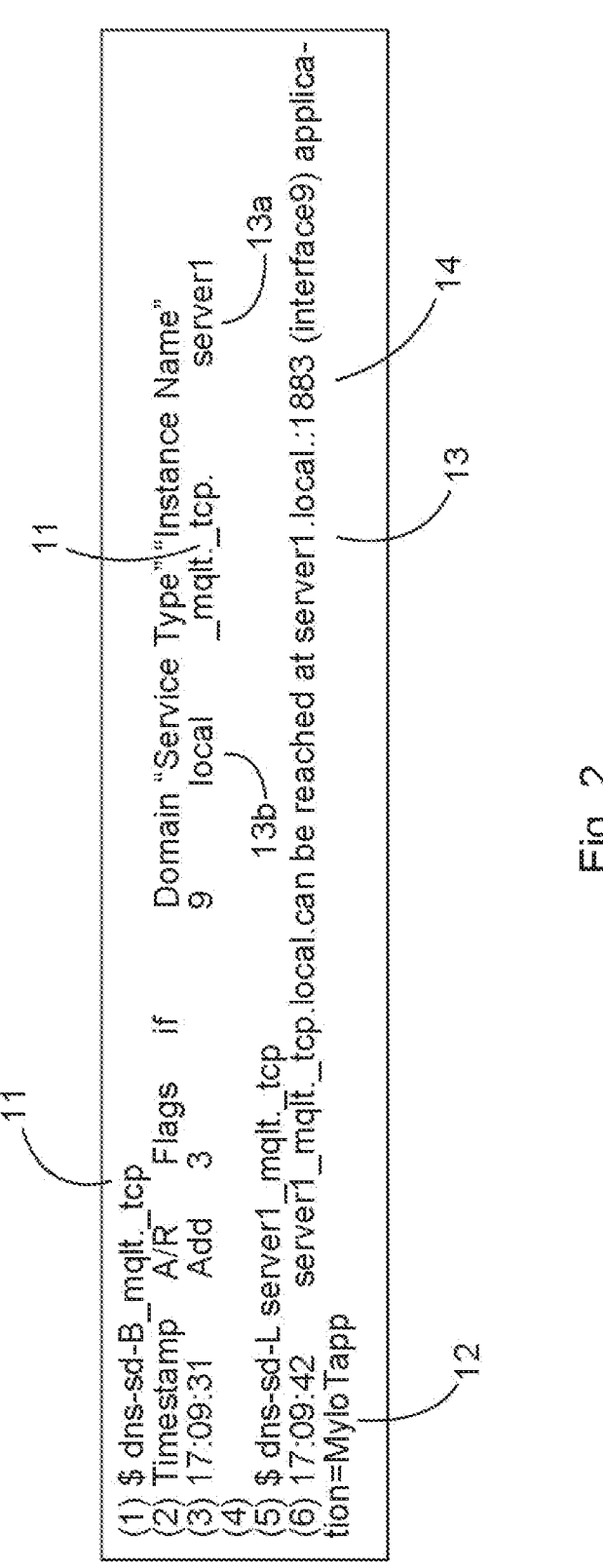
FIG. 2 shows a schematic view of DNS-SD information when searching for services in a network.

FIG. 2 symbolically shows the mDNS-SD request by means of an available mDNS user program. In line (1) the request is made as to which hosts offer the service of type 11, and then the program displays a list (lines 2 and 3) with information on hosts that responded to the request with an announcement, including the server name (13a) and the domain (13b). In line 5, the mDNS user program is prompted to display further information about the found host that is known from the announcement. This includes the network name 13, the port number 14, and the service identifier on the application layer 12 (i.e., its own identifier for the respective IoT network subscriber). The latter was transmitted in the text field TXT of the mDNS-SD announcement.

According to one aspect of the present invention, the IoT network subscriber can be configured as a wireless trans-mitter/receiver or a wireless client.

The wireless transmitter/receiver can perform IP-based communication with the network based on a WiFi protocol, LTE protocol, 5G protocol, or a Bluetooth protocol.

The invention claimed is:

1. A method for identifying network services in a network having at least one host which provides the network services with network service identifiers, and with at least one Internet-of-Things network subscriber in a form of at least one Internet-of-Things sensor, actuator or wireless sender or receiver based on domain name system service discovery (DNS-SD) via a multicast domain name system (mDNS), the method comprising:

transmitting a DNS-SD compliant request for a requested network service type from an Internet-of-Things network subscriber to the network having the at least one host that provides the network services;

receiving a DNS-SD compliant response from one of the at least one host to the DNS-SD compliant request, wherein the DNS-SD compliant response comprises a text field having a network service identifier of a network service corresponding to the requested network service type, transmitting a connection request from the Internet-of-Things network subscriber to the at least one host to which the network service identifier in the DNS-SD compliant response is assigned and which provides the network service corresponding to the requested network service type, and freely selecting the network service identifier for the network service by a user when setting up a system such that the user determines a name of the network service identifier, wherein:

an identifier of the Internet-of-Things network subscriber or the network service identifier is determined by the user based on a system diagram or a system structure, the network service identifier in the text field corresponds to an identifier of an associated network service in an application layer, and an addressing of the Internet-of-Things network subscriber or the at least one host is performed based on IPV6 link local addresses such that the Internet-of-Things network subscriber or the at least one host allocates or assigns IP addresses.

2. The method for identifying network services according to claim 1, wherein the multicast domain name system (mDNS) is a wide-area mDNS.

3. The method for identifying network services according to claim 1, wherein the at least one host is configured to represent the Internet-of-Things network subscriber.

* * * * *